(12) United States Patent  
Kaiser et al.

(10) Patent No.: US 9,346,100 B2  
(45) Date of Patent: May 24, 2016

(54) METHOD FOR PRODUCING A TOOTHED WHEEL

(71) Applicant: Miba Sinter Austria GmbH, Laakirchen (AT)

(72) Inventors: Thomas Kaiser, Vorchdorf (AT); Dietmar Gebhart, Schwanenstadt (AT)

(73) Assignee: Miba Sinter Austria GmbH, Laakirchen (AT)

( * ) Notice: Subject to any disclaimer, the term of this patent is extended or adjusted under 35 U.S.C. 154(b) by 330 days.

(21) Appl. No.: 14/069,467

(22) Filed: Nov. 1, 2013

(65) Prior Publication Data

US 2014/0135160 A1 May 15, 2014

(30) Foreign Application Priority Data

Nov. 12, 2012 (AT) .............................. A 50505/2012

(51) Int. Cl.
*B22F 5/08* (2006.01)
*F16H 55/06* (2006.01)
*F16H 55/30* (2006.01)
*F01L 1/344* (2006.01)

(52) U.S. Cl.
CPC *B22F 5/08* (2013.01); *F16H 55/06* (2013.01); *F16H 55/30* (2013.01); *B22F 2998/10* (2013.01); *F01L 1/3442* (2013.01); *F01L 2103/00* (2013.01)

(58) Field of Classification Search
CPC ...... F16H 55/30; F16H 55/06; F01L 2103/00; F01L 1/3442; B22F 5/08; B22F 2998/10
See application file for complete search history.

(56) References Cited

U.S. PATENT DOCUMENTS

| | | |
|---|---|---|
| 2004/0065164 A1 | 4/2004 | Arlt et al. |
| 2007/0028446 A1 | 2/2007 | Arit et al. |
| 2012/0037104 A1 | 2/2012 | Pohl et al. |
| 2012/0107444 A1 | 5/2012 | Murasugi et al. |

FOREIGN PATENT DOCUMENTS

| | | |
|---|---|---|
| DE | 102 22 132 A1 | 12/2003 |
| DE | 10 2010 034 014 A1 | 2/2012 |
| DE | 10 2011 117 318 A1 | 6/2012 |
| JP | 2011-032547 A | 2/2011 |

*Primary Examiner* — Ryan J Walters
(74) *Attorney, Agent, or Firm* — Collard & Roe, P.C.

(57) ABSTRACT

The invention relates to a method for producing a toothed wheel (1) in net shape or near-net shape quality, in particular a chain wheel, for a VVT system from a powder, with the toothed wheel (1) having an at least approximately cylindrically shaped housing (2) which is delimited in axial direction by one respective end face (6, 7) and which has an outside surface (3), and at the outside surface (3), a toothing (8) having teeth (9) and tooth roots (10) between the teeth (9) is embodied at a distance to both of the end faces (6, 7), and the toothing (8) has a tooth root circle (25) having a tooth root circle diameter, and the powder is filled into a mold (28) and pressed by means of at least one punch, and protrusions (11, 20) are embodied at least in the region of the teeth (9) at the outside surface (3) of the housing (2) and projecting over the latter in radial direction.

6 Claims, 4 Drawing Sheets

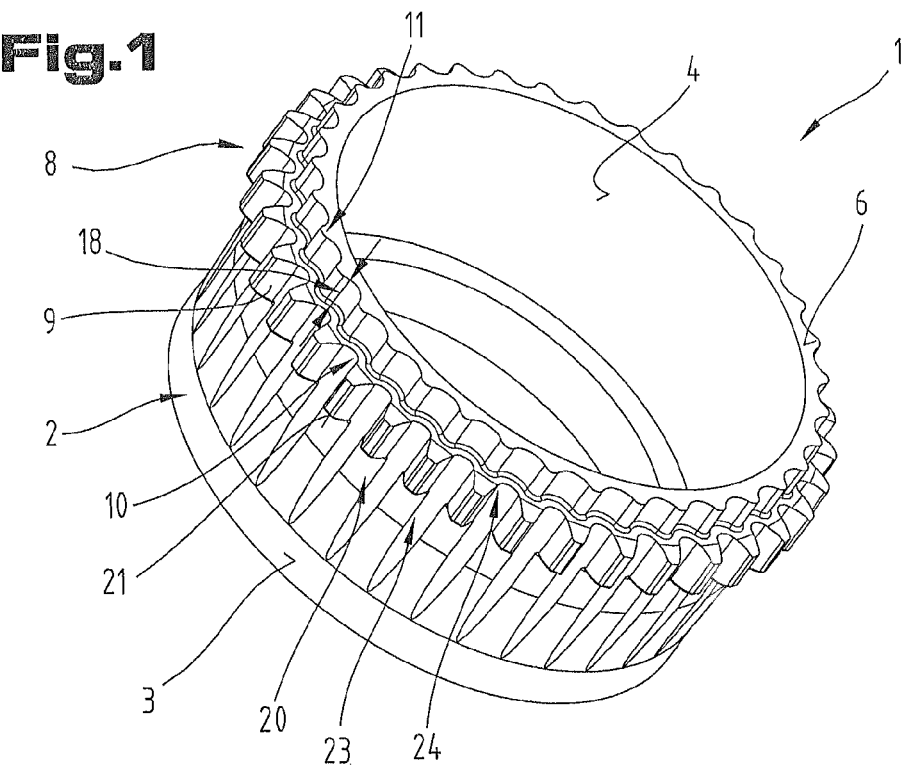
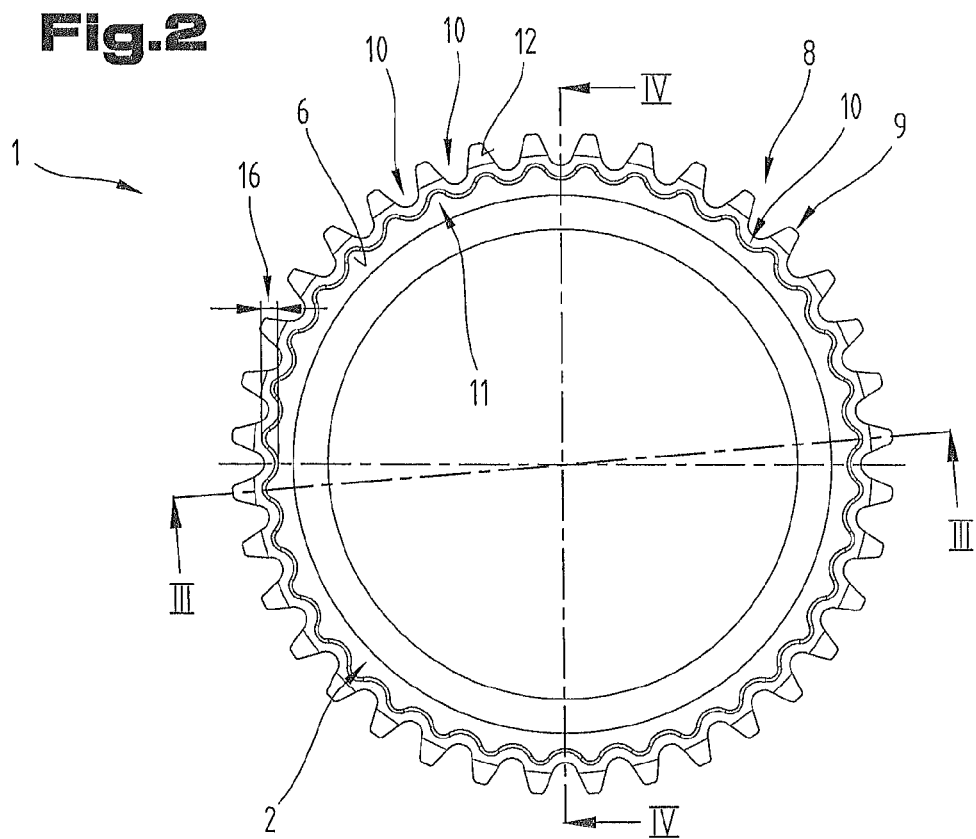

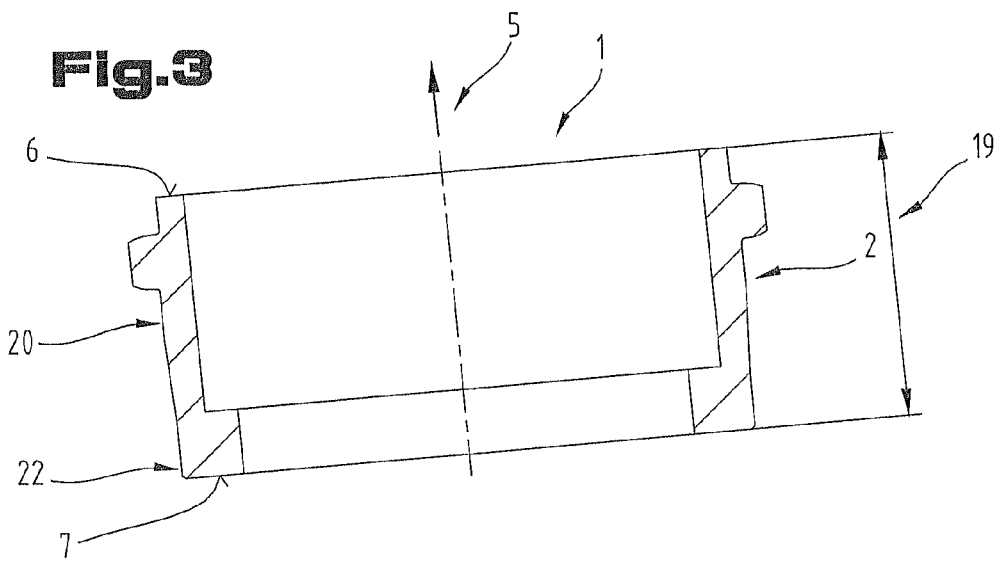
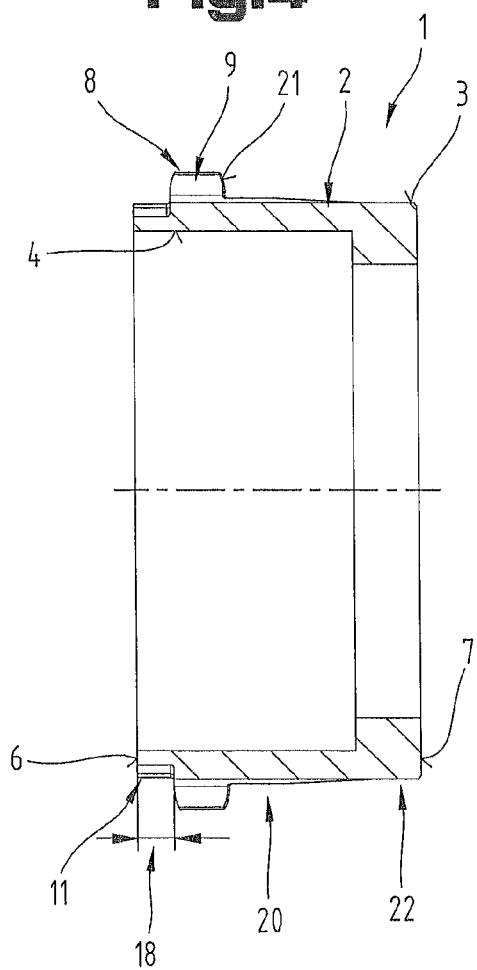
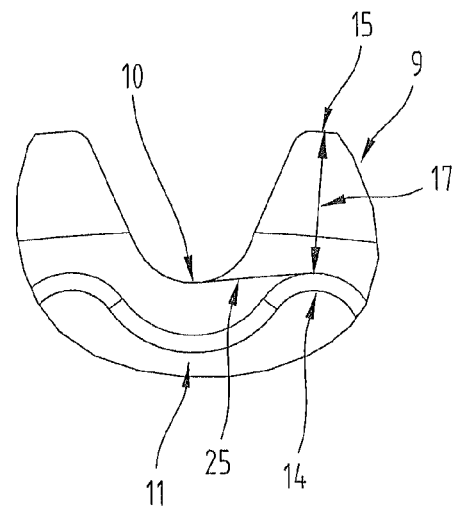

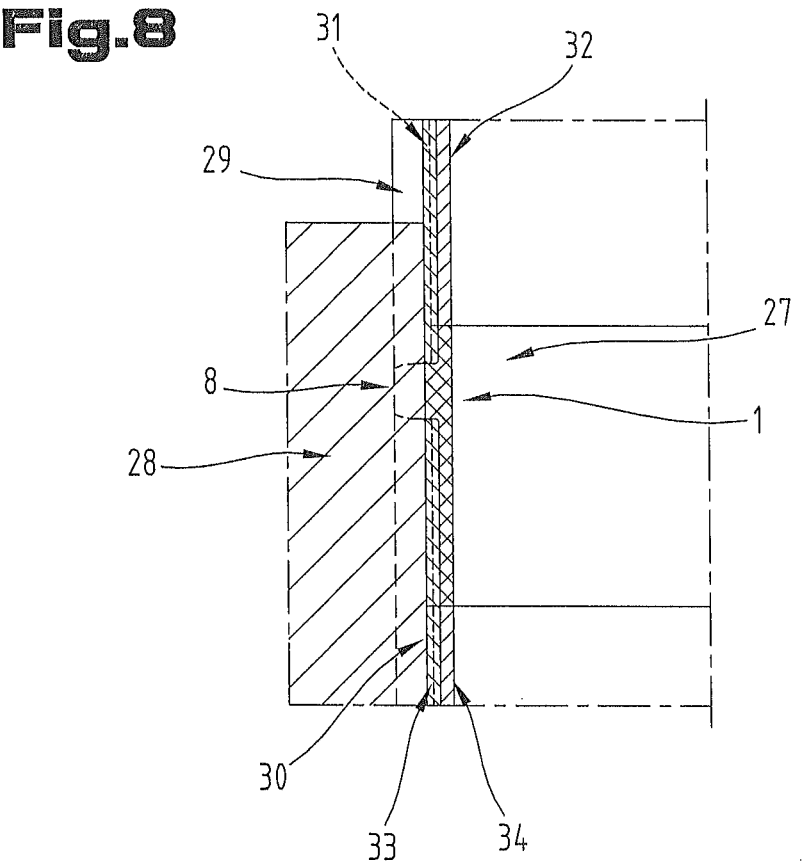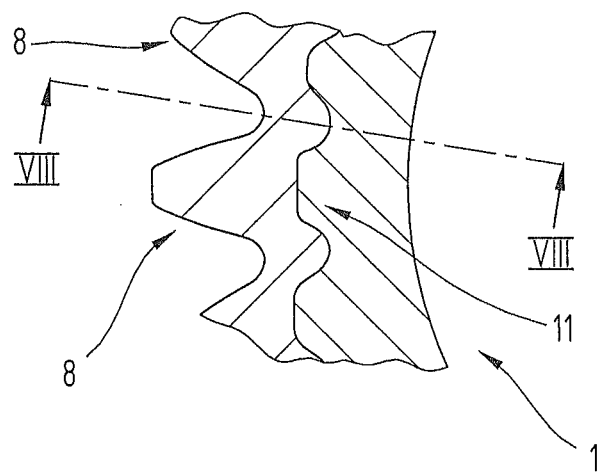

METHOD FOR PRODUCING A TOOTHED WHEEL

CROSS REFERENCE TO RELATED APPLICATIONS

Applicant claims priority under 35 U.S.C. §119 of Austrian Application No. A 50505/2012 filed on Nov. 12, 2012, the disclosure of which is incorporated by reference.

The invention relates to a method for producing a toothed wheel in net shape or near-net shape quality, in particular a chain wheel, for a VVT system from a powder, with the toothed wheel having an at least approximately cylindrically shaped housing which is delimited in axial direction by one respective end face and which has an outside surface, and at the outside surface, a toothing having teeth and tooth roots between the teeth is embodied at a distance to both of the end faces, and the toothing has a tooth root circle having a tooth root circle diameter, and the powder is filled into a mold and pressed by means of at least one punch, as well as a toothed wheel, in particular a chain wheel, for a VVT system made of a powder, with the toothed wheel that has an at least approximately cylindrically shaped housing that is in axial direction delimited by one respective end face and that has an outside surface, and at the outside surface, a toothing having teeth and tooth roots between the teeth is embodied at a distance to both of the end faces, and the toothing has a tooth root circle having a tooth root circle diameter.

The importance of producing near-net-shape components is increasing, as thereby those components can be produced considerably more cost-efficiently. It seems that powder-metallurgy is predestinated for this purpose, as also components having a complex geometry can be manufactured by way of this technology without requiring considerable reworking. But also this technology is reaching its limits, if the geometry is getting too complex, since thin-walled component regions or components bear a higher risk of fracture and consequently an increased spoilage due to the adhesion of the components at the walls of the mold.

Regarding the manufacture of sintered components it is proposed in prior art to assemble such components from individual parts. Document DE 10 2010 034 014 A1 for example describes a method for the powder-metallurgical production of a rotational body, in which a first starting body is compacted from metal powder and a second starting body is formed from metal separately from the first starting body, the starting bodies being placed adjacent to each other in axial contact via end faces in relation to a longitudinal axis of the rotational body and being connected to be permanently fixed, with the first base body being compacted from an aluminum-based powder and the second base body formed from an aluminum material and the starting bodies being collectively sintered at their respective end faces.

The objective of the present invention is to create an above-mentioned toothed wheel in a press-technical way.

The objective is on the one hand achieved by the method previously mentioned and on the other hand by the above-mentioned toothed wheel, and it is according to the method provided that protrusions are embodied at least in the region of the teeth at the outside surface of the housing and projecting over the latter in radial direction, or it is for a toothed wheel provided that protrusions are formed at least in the region of the teeth at the outside surface of the housing and projecting over the latter in radial direction.

It is here advantageous that the wall thickness of the housing can be reduced, with the result that a corresponding reduction of weight can be achieved, but it is nevertheless possible to produce the toothed wheel by means of powder-metallurgical methods, so that it is also possible for a toothed wheel exhibiting a complex geometry to be produced cost-efficiently, as no or only slight reworking is required. It is thus easier to produce high-precision toothed wheels.

According to a variant of embodiment of the method and the toothed wheel it is provided that the protrusions are in axial view embodied in the type of a wave profile. By avoiding edges at the transition regions between the protrusions and the surface of the housing—as seen in radial view—a better demolding characteristic and a better compressibility of the powder or the toothed wheel is achieved. Furthermore, the weight of the toothed wheel is thereby reduced at at least approximately constant stability in the region of the teeth during the pressing step.

It is also possible for the protrusions to be formed from axially elongating the recesses for the tooth roots of the toothing, with the result that also the demolding characteristic and the compressibility can be achieved due to the possibility of the simpler design of the punch.

It can furthermore be provided that the protrusions are repressed. Due to this repressing, which can take place during the shaping by accordingly adjusting the at least one punch, the supporting function of the protrusions for the teeth of the toothing is improved.

The powder is preferably compressed by means of a multi-part punch and a multi-part die. Due to this multi-part design, an improvement of the powder compression is achieved. A better production of components exhibiting a complex geometry, in particular undercuts, is furthermore allowed. It is additionally also possible to simplify demolding characteristics.

It can be provided that the diameter of the tooth root is manufactured to be smaller than a maximum outside diameter of the housing. It is thus possible to reduce the powder used per component and therefore also the weight of the toothed wheel.

It is preferred if the protrusions have a height beyond the surface of the housing, which is selected from a range having a lower limit of 20% and an upper limit of 70% of a tooth height of the teeth. In the event of this height being below 20%, the protrusions achieve a supporting function though, it could however be noted that a higher number of tooth fractures occurred in the mold. Above 70%, there was the risk that the protrusions disturbed the interaction of the toothed wheel with a further tooth element meshing with the toothed wheel or the interaction of the toothed wheel with the chain links of a chain.

It is possible for the protrusions to be arranged directly adjacent to the teeth in axial direction, with the result that the supporting effect for the teeth is recognized more clearly. It is nevertheless also possible that the protrusions are arranged to be spaced apart from the teeth in axial direction. This can particularly be achieved by a subjecting the tooth wheel to a machine-cutting process, with the result that on the one hand, the supporting function can be improved while the tooth wheel is being produced, on the other hand, however, the meshing of the further tooth element or the chain with the toothing of the toothed wheel can be improved due to the spacing of the finished toothed wheel. This embodiment is particularly advantageous if the diameter of the tooth root circle is smaller than the maximum outside diameter of the housing.

It can furthermore be provided that the protrusions are arranged in the regions of both of the axial end faces of the teeth, i.e. the teeth are in each case arranged between two protrusions, with the result that a better stabilization of the teeth during the pressing can be achieved.

For a better understanding of the invention the latter is explained in more detail with reference to the following Figures.

These show in a simplified schematic representation:

FIG. 1 a perspective representation of a toothed wheel;

FIG. 2 the toothed wheel according to FIG. 1 in side view;

FIG. 3 a section through the toothed wheel according to FIG. 2 according to III-III in FIG. 2;

FIG. 4 a section through the toothed wheel according to FIG. 2 according to IV-IV in FIG. 2;

FIG. 5 the detail, in FIG. 2 identified by X, of the toothing of the toothed wheel according to FIG. 2 in enlarged representation;

FIG. 6 a variant of embodiment of a toothed wheel in plan view of toothing;

FIG. 7 the toothed wheel according to FIG. 7 after reworking has been carried out;

FIG. 8 a detail of a variant of embodiment of a pressing tool for producing a toothed wheel;

FIG. 9 a section of the toothed wheel in relation to the pressing tool according to FIG. 8.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

The FIGS. 1 to 4 show a first variant of embodiment of a toothed wheel 1, in particular a chain wheel, in different views.

The toothed wheel 1 according to the FIGS. 1 to 4 is provided for a so-called VVT system (variable valve timing system). The toothed wheel 1 according to the FIGS. 1 to 4 is in particular embodied as a stator for a VVT system.

Such stators, as they are also described by the above-mentioned DE 10 2010 034 014 A1, are used for producing swing-wing adjusters for adjusting the rotational angular position of a valve control shaft, e.g. a camshaft, relative to a crankshaft of an internal combustion engine. Stator refers to the part of the swing-wing adjuster which is driven in a in a fixed rotational angular relationship to the crankshaft and outputs onto the valve control shaft via a rotor of the swing-wing adjuster. The rotor can be rotated back and forth about the longitudinal axis relative to the stator within a limited pivoting angle and thus the rotational angular position of the valve control shaft relative to the crankshaft can be adjusted. The stator can be mechanically coupled to the crankshaft by means of its drive disc, in particular by a chain drive or a cogged-belt drive.

According to a powder-metallurgical process, the toothed wheel 1 is manufactured from a sintering powder, in particular from a metal powder, preferably an iron powder. Such powder-metallurgical processes have been known from prior art and include in particular the process steps of optional mixing of powders, compressing powder to achieve a green compact, optionally machining the green compact, sintering the green compact, calibrating the sintered component, optionally reworking, such as grinding, washing, curing and suchlike. As these principle process steps and the different powder-metallurgical methods have been known from prior art, it is at this point referred to relevant literature.

The toothed wheel is furthermore manufactured to have net shape or near-net shape quality. Net shape quality in this case means that no machine-cutting is carried out after sintering. Near-net shape, in contrast, refers to a quality that allows a slight machine-cutting for forming the final contour. These terms will be used within the scope of this description in accordance with the technical language use.

The toothed wheel 1 has at least one approximately cylindrically shaped housing 2. "At least approximately cylindrically shaped" means that it is possible for an outside surface 3 and/or an inside surface 4 of the housing 2 to deviate from an exact cylindrical shape depending on the intended use of the toothed wheel 1.

In axial direction according to arrow 5, the housing 2 is delimited by a first end face 6 and a second end face 7.

A toothing 8 is arranged or embodied on the outside surface 3, which toothing 8 has teeth 9 and tooth roots 10 between the teeth 9.

The toothing 8 is designed for letting a drive chain engage. There is however also the possibility that the teeth 9 have an other shape, for example for a toothed wheel or a toothed bar of another toothed wheel or generally a further toothed part having a toothing to engage.

The toothing 8 is arranged to have a distance to both of the end faces 6, 7, and in the variant of the embodiment illustrated, the distance to the first end face 6 is smaller than the distance to the second end face 7.

The toothing 8 is designed to be integral with the housing 2, i.e. deviating from the above-cited prior art the tooth wheel is not composed of two components. Generally, the entire toothed wheel 1 is designed to be one piece and integral.

Several protrusions 11 are arranged or embodied on the outside surface 3 of the housing 2 to project beyond the latter in radial direction. The protrusions 11 are arranged in the region of the teeth 9. The protrusions 11 are in particular arranged between two tooth roots 10 in the region of tooth end faces directing in radial direction.

The cross-section of the protrusions 11—as viewed in axial direction according to arrow 5—can be square, rectangular, triangular, trapezoid, polygonal, etc. In the preferred embodiment, the protrusions 11 are however embodied as a kind of a wave profile. It is preferred if the wave troughs 13 are disposed below the tooth roots 10 and the wave peaks 14 below the tooth crests 15 of the teeth 9, as can be gathered particularly from the detail in FIG. 5. As viewed in radial direction in each case, the deepest places of the wave troughs 13 are particularly arranged exactly below the deepest places of the tooth roots 10 and/or the highest places of the wave peaks 14 are exactly disposed below the highest places of the tooth crests 15, in each case within the frame of the manufacturing tolerances. In the case of this embodiment, any protrusions 11 are connected to one another to be one common wave profile. It is essentially possible to approximately reproduce the "wave shape" of the toothing 8 by means of the protrusions 11. It is at this point expressively stated that no further toothing is formed from these wave shape of the protrusions 11.

In the preferred embodiment, one protrusion 11 is disposed in the region of one tooth 9, with the result that one protrusion 11 is formed in the region of each tooth 9.

It should be noted that it is possible within the scope of the invention that more than one protrusion 11, e.g. two, etc., in the region of one of the tooth end faces 12 are arranged per tooth 9 or in the region of individual teeth 9.

In radial direction, the protrusions 11 can have a height 16 (FIG. 2) above the outside surface 3 of the housing 2, which height is selected from a range having a lower limit of 20%, in particular 30%, and an upper limit of 70%, in particular 60%, of a tooth height 17 (FIG. 5) of the teeth 9. This height 16 is in this case measured starting from that place, from where the outside surface 3 of the housing 2 stops having the cylindrical shape, as it is e.g. formed in FIG. 2 in the region following the second end face 7.

A width 18 of the protrusions 11 in axial direction according to arrow 5 can be selected from a range having a lower limit of 5%, in particular 10%, and an upper limit of 80%, in particular 70%, of a housing width 19 in the same direction. It is particularly possible for the protrusions 11 to extend from the toothing 8 up to the first end face 6, as can be gathered from FIGS. 1 to 4.

It is in principle possible that the protrusions 11 are arranged on only one side of the teeth 9, as viewed in axial direction according to arrow 5. The FIGS. 1 to 4 however show the preferred embodiment of the toothed wheel 1, where—besides the protrusions 11 in the region of the tooth end face 12—protrusions 20 are also arranged in the region of a further tooth end face 21 directing towards the, or in the direction of the second end face 7.

It is in principle possible that those protrusions 20 are embodied like the protrusions 11, so that it is in this context referred to the above-mentioned explanations.

In the preferred embodiment, however, these further protrusions 20 are designed to be ramp-shaped, having an ascending height starting at the outside surface 3 of the housing 2 up to the region of the teeth 9, as can particularly be gathered from FIGS. 3 and 4. The inclination can in this case be selected from a range having a lower limit of 0.5° and an upper limit of 5°. This being the case, it is also possible for the further protrusions 20 to have an inclination of 0°, in particular in the region of the teeth 9.

As can be gathered from these further protrusions 20 in FIGS. 1 to 4, the protrusions 20 can also end ahead of the second end face 7 of the housing 2, so that a region 22 of the cylindrically shaped housing 2 stays free from further protrusions. This also applies to the protrusions 11. It is naturally also possible for the further protrusions 20 to extend to the second end face 7 of the housing 2.

Referring to the terms "cylindrically shaped housing 2" and "protrusions 11, 20", it is generally noted that the protrusions 11 or the further protrusions 20 start where the housing starts deviating from the cylindrical shape. It is in this case also possible that the housing is stepped, i.e. has several cylinders following one another and exhibiting different diameters. In this case, the respective description regarding the protrusions 11 or 20 refers to the respectively corresponding cylindrically shaped outside surface 3.

It is further noted that the housing 2 can at its inside surface 4 also have functional installations that are designed to be integral with the housing 2, preferably integral with the housing 2 by way of one or several pressing steps. The wording "at least approximately cylindrically shaped" above refers to the housing 2 deviating from the cylindrical shape due to these installations.

FIGS. 1 to 4 furthermore show that the protrusions 11 exhibit a geometry different from the further protrusions 20. It is within the scope of the invention however possible that the geometry of protrusions 11 is the same as of the further protrusions 20.

The further protrusions 20 are separated from one another by means of recesses 23. In the preferred embodiment, these recesses 23 are formed by axial elongation of recesses 24 for forming the tooth roots 10 of the toothing 8. In other words: the tooth roots 10 are elongated in the direction towards the second end face 7 of the housing 2. It is in this case preferred if the diameter of the recesses 23 decreases as viewed in top view between the further protrusions 20 in the direction towards the second end face 7 of the housing, i.e. if they are embodied to be at least approximately tapering to a point, and the "point" is designed to be rounded.

It is also possible that the recesses 23 between the further protrusions 20 have another cross-sectional shape, e.g. rectangular or trapezoid or having rounded lateral faces, etc. The rounded lateral faces are in this case also possible for the tapering design of these recesses 23.

The height 16 in radial direction of the protrusions 11 can be selected in such a way that these protrusions 11 reach or have their maximum height 16 at the height of a tooth root circle 25 of the tooth roots 10, as can be gathered from FIG. 5. The tooth root circle here designates the diameter of the circle that is formed by the deepest places of the tooth roots 10.

There is nevertheless also the possibility that the protrusions 11 extend in radial direction to above the tooth root circle 25 or end below the latter.

According to another embodiment, it may be provided that the tooth root circle 25 has a smaller diameter than a maximum outside diameter of the cylindrically shaped housing 2 in the region adjacent to the tooth roots 10, in other words: the tooth roots 10 are formed by negative depressions in the housing 2.

In the embodiment of the toothed wheel 1 shown in FIGS. 1 to 4, the protrusions 11 and 20 are arranged according to arrow 5 in axial direction to be directly adjacent to the teeth 9 of the toothing 8.

In FIGS. 6 and 7, another and optionally independent embodiment of the toothed wheel 1 is shown, with the same reference numbers or same component names as in the above Figs. being used for the same parts. In order to avoid unnecessary repetitions, reference is made to the above FIGS. 1 to 5.

The essential differences as compared to the above-described embodiment of the tooth wheel 1 is that, on the one hand, only the further protrusions 20 are embodied, i.e. only the region between the first end face 6 of the housing 2 and the teeth 9 is free from protrusions, and that, on the other hand, the further protrusions 20 are arranged to be spaced apart from the teeth in axial direction, i.e. a circumferential groove 26 between the teeth 9 and the further protrusions 20 is embodied.

This embodiment is made of a sintered and calibrated "blank" of a toothed wheel 1, which is shown in FIG. 1, by way of machine-cutting. For this purpose, at first the blank has the toothing 8 extending in axial direction to the first end face 6 of the housing 2. A section of this toothing 8 starting at the first end face 6 is then removed.

Further, the further protrusions 20 of the blank are embodied to lie against the teeth 9, and then, a part of the further protrusions 20 is removed in the region adjacent to the teeth 8 by forming the groove 26.

FIG. 8 shows a detail of a pressing tool 27 for producing the toothed wheel 1.

Figure 6:
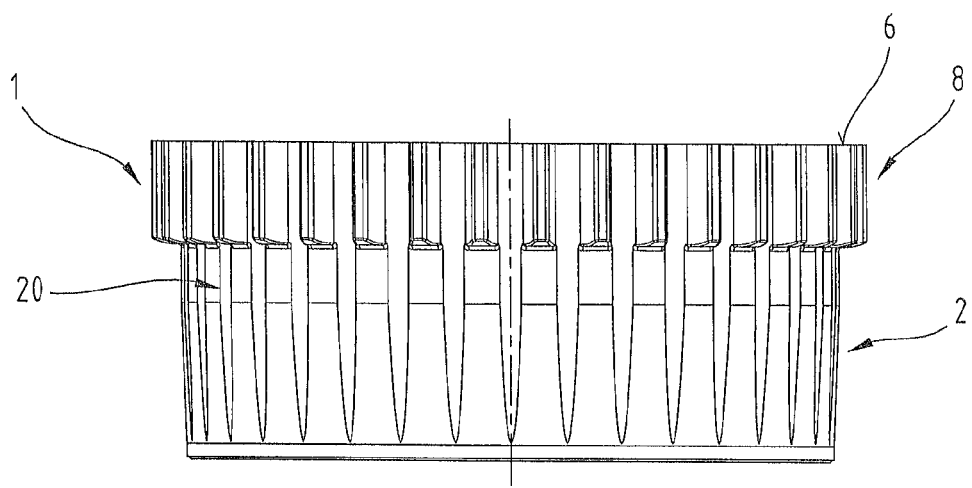
Figure 7:
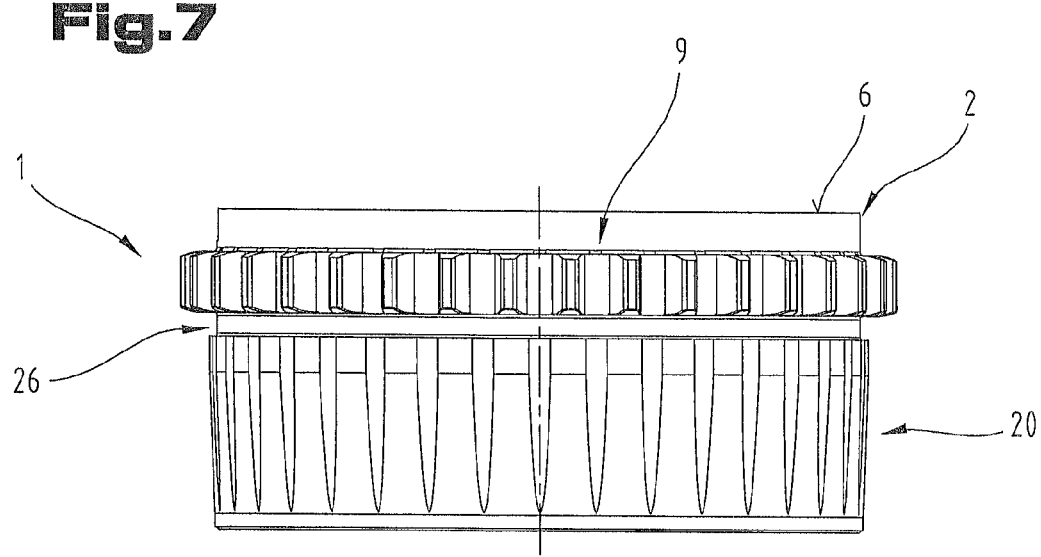
FIG. 7 shows the finished toothed wheel 1 after these machining steps. In this embodiment, the toothed wheel 1 is thus produced in the near-net shaped quality.

It is noted that this pressing tool 27 can be used for compacting the powder for forming the green compact for the toothed wheel 1 and/or for calibrating the sintered toothed wheel 1. The method according to the invention thus refers to the pressing step and/or the calibrating step of the powder-technological production of the toothed wheel 1.

The pressing tool 27 has a mold 28, a punch 29 and a die 30. The punch 29 and/or the die 30 are embodied to be displaceable relative to each other in vertical direction.

It is preferred if the punch 29 is designed to be multi-part and has at least a first part of punch 31 and a second part of punch 32. This being the case, the first part of punch 31 is disposed between the mold 28 and the second part of punch 32. The two parts of the punch 31, 32 are embodied to be displaceable independent from each other.

It is also preferred if the die 30 is embodied to be multi-part and has at least a first part of die 33 and a second part of die 34. This being the case, the first part of die 33 is disposed between the mold 28 and the second part of die 34. The two part of the die 33, 34 are designed to be displaceable independent from each other.

FIG. 9 shows a detail of the toothed wheel 1, and the intersection line VIII-VIII corresponds to the section through the pressing tool 27 in FIG. 8. The dashed line illustrated in FIG. 8 represents the tooth contour of the toothing 8

Splitting the punch 29 into the two parts of the punch 31, 32 and splitting the die 30 into the two parts of the die 33, 34 is such selected that the part of punch 31 and the part of die 33 are provided for machining or embodying the toothing 8 and the part of punch 32 and the part of die 34 are provided for machining or embodying the protrusions 11.

Using this pressing tool 27 it is possible to produce the toothed wheel 1 in net shape or near-net shape quality.

Optionally, at least regions of the toothing 8 are brushed and/or grinded after the toothed wheel 1 has been produced.

The multiple parts of the punch 29 and/or the die 30 allow the protrusions 11, 20 to be repressed by way of adjusting the part of punch 32 and/or the part of die 34.

According to the method for producing a toothed wheel 1 in net shape or near-net shape quality for a VVT system it is provided that the toothed wheel 1 having the at least approximately cylindrically shaped housing 2 which is in axial direction delimited by one end face 6, 7 and which has the outside surface 3, is made from a powder, and at the outside surface 3, the toothing 8 having teeth 9 and tooth roots 10 between the teeth 9 is embodied at a distance from the two end faces 6, 7, and the toothing 8 has a tooth root circle 25 having a diameter, and the powder is filled into the mold 28 and compacted by means of at least one punch, and protrusions 11, 20 are formed in the region of the teeth 9 at the outside surface 3 of the housing 2, which protrusions project beyond the latter in radial direction.

This method can also be used for the production of other sintered parts, such as cogged-belt wheels or chain wheels.

The method is particularly provided for producing thin-walled sintered parts having a toothing 8.

The exemplary embodiments show possible embodiment variants of the toothed wheel 1 and the pressing tool 27.

For the sake of good order, finally, it should be pointed out that, in order to provide a clearer understanding of the structure of the toothed wheel 1 and the pressing tool 27, they and their constituent parts are illustrated to a certain extent out of scale and/or on an enlarged scale and/or on a reduced scale.

| List of Reference Numerals | |
|---|---|
| 1 | Toothed wheel |
| 2 | Housing |
| 3 | Outside surface |
| 4 | Inside surface |
| 5 | Arrow |
| 6 | End face |
| 7 | End face |
| 8 | Toothing |
| 9 | Tooth |
| 10 | Tooth root |
| 11 | Protrusion |
| 12 | Tooth end face |
| 13 | Wave trough |
| 14 | Wave peak |
| 15 | Tooth crest |
| 16 | Height |
| 17 | Tooth height |
| 18 | Width |
| 19 | Housing width |
| 20 | Protrusions |
| 21 | Tooth end face |
| 22 | Region |
| 23 | Recess |
| 24 | Recess |
| 25 | Tooth root circle |
| 26 | Groove |
| 27 | Pressing tool |
| 28 | Mold |
| 29 | Punch |
| 30 | Die |
| 31 | Part of punch |
| 32 | Part of punch |
| 33 | Part of die |
| 34 | Part of die |

The invention claimed is:

1. Method for producing a toothed wheel in net shape or near-net shape quality for a VVT system, the method comprising steps of:
    filling a powder into a mold,
    pressing the powder in the mold via at least one punch so that the powder forms a compact, and
    sintering the compact so that the compact forms the toothed wheel,
    wherein the toothed wheel has an at least approximately cylindrically shaped housing which is delimited in axial direction by a first end face and by a second end face, the housing having an outside surface,
    wherein at the outside surface the toothed wheel has a toothing having teeth
    wherein the toothing has tooth roots between the teeth,
    wherein the toothing is embodied at a distance to both of the first end face and the second end face, and the toothing has a tooth root circle having a tooth root circle diameter, and
    wherein protrusions are embodied at least in the region of the teeth at the outside surface of the housing and projecting over the outside surface of the housing in radial direction,
    wherein the toothing is integral with the housing, and
    wherein the protrusions do not form a further toothing.

2. Method according to claim 1, wherein the protrusions, in axial view, have a wave profile.

3. Method according to claim 1, wherein the tooth roots are formed by forming first recesses in the outside surface,
    wherein the protrusions are separated from one another by second recesses in the outside surface, and
    wherein the first recesses axially extend into the second recesses, respectively.

4. Method according to claim 1, wherein the protrusions are repressed.

5. Method according to claim 1, wherein the powder is pressed between a multi-part punch and a multi-part die.

6. Method according to claim 1, wherein the tooth roots are formed by negative depressions in the housing.

* * * * *